United States Patent Office 2,954,700
Patented Oct. 4, 1960

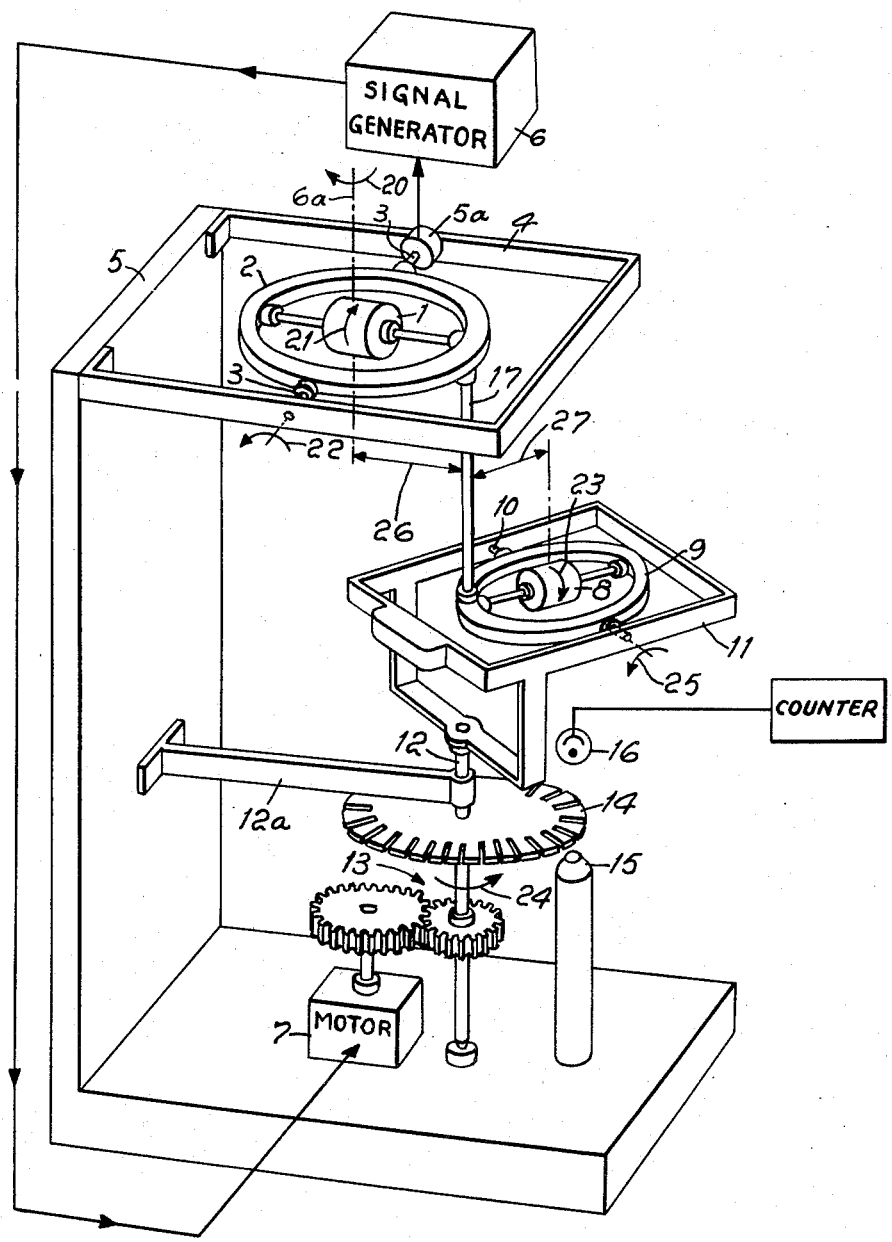

2,954,700

ROTATION SENSING DEVICE

Georges A. Deschamps, Urbana, Ill., assignor to International Telephone and Telegraph Corporation, Nutley, N.J., a corporation of Maryland Filed Dec. 16, 1958, Ser. No. 780,822

6 Claims. (Cl. 74—5.34)

This invention relates to rotation sensing devices and more particularly to an integrating gyroscope having rotation sensing and torquing means coupled to its output axis for detecting the angular position of a body.

In the past, integrating gyroscopes having rotation sensors, torquers and dampers coupled to the output axis of said gyroscopes have been employed for detecting the rotational position of a body with respect to a reference frame. In some of these prior systems the torquer is an electrical torquing device and the sensor is an electrical sensor and the torquer is controlled by electrical signals derived from the sensor. The current fed to the torquer is a measure of the rotation rate of the body to which the system is attached, about the input axis of the gyroscope. Consequently, upon integrating this current with the proper scaling factor, the total rotation angle of the body about the gyroscope input axis is obtained.

One difficulty of such prior systems is that the electrical torquers are not linear over a sufficiently wide dynamic range. Consequently, such gyroscope systems are suitable only for measuring rotational angles of a body where the rotational rate of the body is limited to some predetermined value. If the rotational rate of the body exceeds this predetermined value, the system accuracy becomes poor.

Another limitation of such prior systems is that the integration of the current to the torquer to yield a signal indicative of rotational angle, is subject to error. As a result another source of error contributes to the final determination of the rotational angle of the body with respect to the reference.

It is an object of this invention to provide an improved rotation sensing device having none of the limitations mentioned above.

It is another object to provide a rotation sensing device for sensing rotations of a body with respect to a reference and producing pulses each indicative of equal increments of rotation of said body with respect to said reference.

It is another object to provide an integrating gyroscope system for use over a wide dynamic range.

It is another object to provide linear torquing means for torquing a gyroscope about its output axis, said torquing means being linear over a wide dynamic range, and uneffected by variations in the power supply energizing gyroscopes included therein.

It is a feature of this invention to employ at least two gyroscopes with means for sensing precessions of one of said gyroscopes, driving means responsive to said sensing means for rotating another of said gyroscopes and means so coupling said gyroscopes that precessions of one are opposed by precessions of the other.

It is another feature that the coupling means coupling the gyroscopes be such that their output rotations are coupled in mechanical opposition so that precessions of the one are opposed by precessions of the other.

It is another feature to provide a system for sensing body rotations about a given axis including two gyroscopes orientated with their input axes parallel to said given axis with rotation sensing means coupled to the output axis of one of these gyroscopes, drive means responsive to said rotation sensing means for rotating the second gyroscope about its input axis in a direction opposite to the rotation of said body and mechanical means so coupling the outputs of said first and second gyroscopes that precessional tendencies of said first gyroscope are opposed by precessional tendencies of said second gyroscope.

The foregoing and other objects and features of this invention and the manner of attaining them will become more apparent and the invention itself will be best understood by reference to the following description of an embodiment of the invention taken in conjunction with the accompanying drawing comprising the sole figure, wherein:

The figure is a diagram of an integrating gyroscope system producing pulses each indicative of equal increments of rotation of a body to which the system is mounted.

In the figure, there is shown a spinning gyroscope 1 supported by gyroscope gimbal 2. Gimbal 2 is supported for rotation about gyroscope output axis 3 by frame 4 which is fixed to body 5. Rotation sensing device 5a is coupled to axis 3 of gyroscope 1 and serves to sense rotations of that gyroscope about axis 3 in response to rotations of body 5 about axis 6. The output of rotation sensor 5a controls signal generator 6 which generates a signal for energizing motor 7.

A second gyroscope 8 is supported by gyroscope gimbal 9 which is suspended for rotation about output axis 10 by frame 11. Frame 11 is in turn, supported by shaft 12 and shaft 12 is supported from body 5 by suitable means such as arm 12a. Consequently, rotations of frame 11 about shaft 12 cause output axis 10 of gyroscope 8 to move in a plane which is at all times parallel with output axis 3 of gyroscope 1. Shaft 12 is driven in rotation by mechanical gears 13, coupling shaft 12 to the output of motor 7.

Also coupled to shaft 12 is calibrated disk 14 having slots cut radially from its edge at equal angles thereabout. These slots are illuminated by light source 15. A photocell 16 detects the light from source 15 which passes through the slots cut in disk 14 and a pulse is produced in the output of photocell 16, each time a disk 14 rotates through an angle subtended by adjacent slots. Consequently, the output from photocell 16 consists of pulses each representing equal increments of rotation of calibrated disk 14.

Gimbal 9 of gyroscope 8 is coupled to gimbal 2 of gyroscope 1 by mechanical means such as rod 17. Consequently, in operation a rotation of body 5 about input axis 6 causes gyroscope 1 to precess and gyroscope gimbal 2 tends to rotate about axis 3, this rotation being detected by rotation sensor 5 controlling signal generator 6 which energizes motor 7. Motor 7 is energized so that it rotates shaft 12 and frame 11 in such a direction that gyroscope 8 precesses about axis 10 in a direction opposite to the precessional direction of gyroscope gimbal 2. Through the action of the mechanical linkage consisting of rod 17, the precessional tendency of gyroscope 8 mechanically opposes the precessional tendency of gyroscope 1. For example, if body 5 should rotate about input axis 6 in the direction of arrow 20, and gyroscope 1 is spinning in the direction of arrow 21, then gimbal 2 will tend to precess about axis 3 in the direction of arrow 22. Furthermore, if gyroscope 8 is spinning in the direction of arrow 23, then the output of rotation sensor 5 will cause motor 7 to be energized in such a manner that shaft 12 will be rotated in the direction of arrow 24 causing gimbal 9 of gyroscope 8 to precess about axis 10 in the direction of arrow 25. This precession of gimbal 9 in the direction of arrow 25 will oppose the precession of gimbal 2 in the direction of arrow 22 by virtue of the linkage between gimbals 2 and 9 formed by rod 17.

The angular momentums of gyroscopes 1 and 8 and the torquing arms applied by these gyroscopes, denoted 26 and 27, to rod 17 are preferably established so that the rotation rate input to frame 11 which supports gyro gimbal 9 is the same as the rotation rate of body 5 about axis 6. However, for some applications it may be desired that the rate of rotation of frame 11 and shaft 12 be greater than the input rotational rate of body 5 about axis 6. When such a condition is desired and the ratio of rotation rates is denoted by the factor K, then it can be shown that K may be expressed as follows:

$$K = \frac{H_1}{H_8} - 1$$

The above expression is more apparent when we consider the following. If the angular momentum of gyroscope 1 is represented by the term $H_1$, the angle momentum of gyroscope 8 is represented by the term $H_8$ and the rotation rate of body 5 about axis 6 is denoted $w$, then the rotation rate which must be imparted to gyroscope 8 by virtue of its rotation about axis 12, denoted $w_{12}$, is expressed as follows.

$$H_1 w = H_8(w + w_{12})$$

Consequently, if the scale factor $K = w/w_{12}$, then the first expression above defining this scale factor K in terms of the angular momentums of the gyroscopes is justified.

One advantage of employing means such as described above for torquing an integrating gyroscope is that the torquing means remains ideally linear at all times regardless of the input rotation rate such as a rotation of body 5 about axis 6. Furthermore, the scale factor K is uneffected by power supply fluctuations which cause gyroscopes 1 and 8 to rotate. Since any such fluctuations effect $H_1$ and $H_8$ in exactly the same manner the ratio $H_1/H_8$ is unaltered and K is unaltered.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for sensing rotations of a body about a body axis comprising first and second gyroscopes a gimbal for each gyroscope rotatably supported by said body, means for sensing precessions of said first gyroscope in response to rotations of said body about said body axis, drive means responsive to said sensing means for rotating said second gyroscope and means coupling the gimbals of said first and second gyroscopes in mechanical opposition whereby precessions of said first gyroscope are opposed by precessions of said second.

2. A system for sensing and indicating rotations of a body about a given body axis comprising a first gyroscope, rotation sensing means coupled to the output of said first gyroscope, a second gyroscope, a gimbal for each gyroscope rotatably supported by said body drive means responsive to said rotation sensing means for rotating said second gyroscope, means so coupling the gimbal of said second gyroscope to the gimbal of said first gyroscope that precessions of said gyroscope first caused by rotations of said body about said given axis are opposed by precessions of said second gyroscope caused by rotations of said drive means and means coupled to said drive means for indicating rotations of said body.

3. A system for sensing rotations of a body about a given body axis comprising a first gyroscope having its input axis parallel to said given axis rotation sensing means coupled to the output of said first gyroscope, a second gyroscope responsive to rotations about an axis parallel to said given axis, a gimbal for each gyroscope rotatably supported by said body drive means responsive to said rotation sensing means for rotating said second gyroscope about said parallel axis, mechanical means so coupling the gimbals of said first and second gyroscopes that precessional motions of said first gyroscope resulting from rotations of said body about said given axis are opposed by precessional motions of said second gyroscope resulting from rotations of said second gyroscope by said drive means and means coupled to said drive means for indicating said rotations.

4. A system as in claim 3, which said means for indicating includes optical means illuminating a light sensitive device through calibrated apertures so controlled by said drive means that fluctuations appear in the signal from said light sensing means which are indicative of equal increments of rotation of said body about said given axis and means for counting said fluctuations.

5. A system for sensing rotations of a body about a given body axis comprising a first single degree of freedom gyroscope supported to rotate with said body having its input axis parallel to said given body axis, a second single degree of freedom gyroscope supported by said body for rotation about the input axis of said second gyroscope, a gimbal for each gyroscope, means for sensing precessional motions of said first gyroscope, drive means supported by said body for rotating said second gyroscope, means coupling the output of said sensing means to the input of said drive means and mechanical means so coupling the gimbal of said second gyroscope to the gimbal of said first gyroscope that precessions of said first are opposed by precessions of said second.

6. A system as in claim 5, further including means for detecting the rotational input to said second gyroscope comprising optical means illuminating a light sensitive device through spaced apertures, said apertures being located in a disk driven in rotation by said drive means so that fluctuations appear in the signal from said light sensitive device which are indicative of equal increments of rotation of said body about said body axis.

References Cited in the file of this patent

UNITED STATES PATENTS

| | | |
|---|---|---|
| 2,637,914 | Rawlings | May 12, 1953 |
| 2,713,134 | Eckweiler | July 12, 1955 |
| 2,801,544 | Wagner | Aug. 6, 1957 |